G. FARNER.
Wagon-Brakes.

No. 156,781. Patented Nov. 10, 1874.

UNITED STATES PATENT OFFICE.

GABRIEL FARNER, OF ORRSTOWN, PENNSYLVANIA, ASSIGNOR TO HIMSELF AND HENRY CAW.

IMPROVEMENT IN WAGON-BRAKES.

Specification forming part of Letters Patent No. 156,781, dated November 10, 1874; application filed May 9, 1874.

*To all whom it may concern:*

Figure 1:
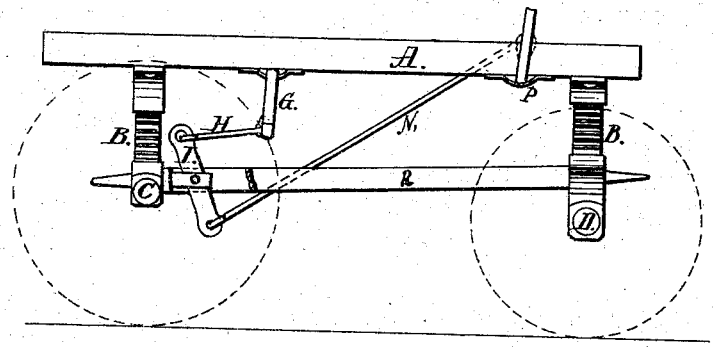
Figure 2:
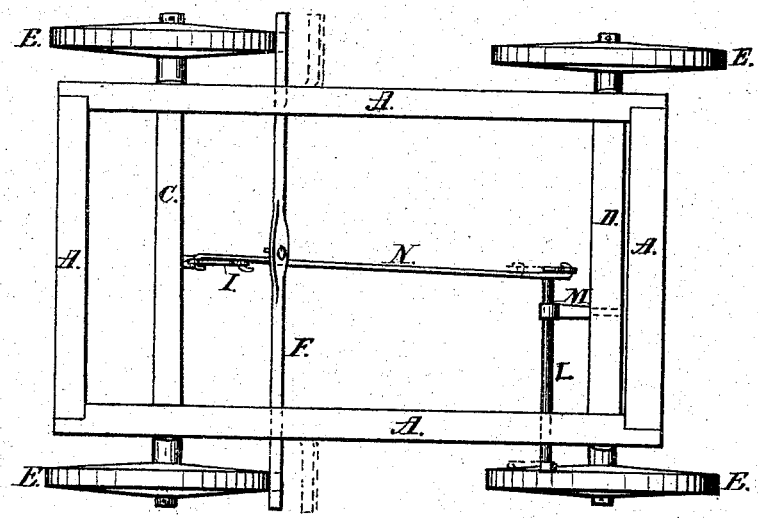

Be it known that I, GABRIEL FARNER, of Orrstown, in the county of Franklin and State of Pennsylvania, have invented an Improvement in Wagon-Brakes, of which the following is a specification:

The chief object of my invention is to make a simple and yet efficient brake for heavy wagons, and also to balance the strain between the rear axle and the wagon-bed, in such a manner as to relieve the elliptic springs in going down steep hills. This invention is the result of many years' experience as a blacksmith in Pennsylvania, where I have seen the difficulty of carrying heavy wagon-loads over the mountains. My invention consists of a novel arrangement and combination of three levers and two connecting-rods with the bed-frame of the wagon, and with the rear axle, as will be more fully explained in the following description:

In the accompanying drawing, Figure 1 is a side view of a wagon with my improved brake applied thereto. Fig. 2 is a top view of the same.

The wagon-bed A rests upon the elliptic springs B, and is supported by the axles C and D and the wheels E, in the usual manner. The double elbow-lever F is attached, in the usual manner, to the bed-frame A, and provided with the ordinary shoes, for bearing against the hind wheels of the wagon. On the center of this lever F is an arm, G, connected to lever I by means of a link, H. This lever I is pivoted upon the reach R, so as to strain upon the hind axle C in applying the brake. A connecting-rod extends forward from lever I, and is attached to the short arm of the brake-lever L, which is secured to the bed A by means of a staple, M, and a box-cap, P, thus bringing the brake to strain upon the forward springs and relieve them from the forward pressure of the load in going down hill.

By this simple and cheap construction and arrangement I secure all the advantages of an efficient brake, which is very difficult to break or derange; and I also completely relieve the elliptic springs from side strains in carrying heavy loads down hill.

I claim—

The combination of the reversing-lever I, link H, arm G of the lever F, connecting-rod N, and brake-lever L, substantially as and for the purposes set forth.

GABRIEL FARNER.

Witnesses:
JOHN H. LECHRON,
D. D. SWANGER.